United States Patent [19]
Plangetis

[11] Patent Number: 5,667,627
[45] Date of Patent: Sep. 16, 1997

[54] HAND HELD VACUUM HEAT SEALER APPARATUS

[75] Inventor: Gus F. Plangetis, Annapolis, Md.

[73] Assignee: The United States of America as represented by the Secretary of the Navy, Washington, D.C.

[21] Appl. No.: 520,970

[22] Filed: Aug. 15, 1995

[51] Int. Cl.$^6$ .............................. B65B 31/06; B65B 31/20
[52] U.S. Cl. .................... 156/579; 156/583.1; 156/583.9; 53/512; 53/390
[58] Field of Search ................................ 156/579, 583.1, 156/583.8, 583.9; 53/434, 479, 481, 512, 373.7, 390

[56] References Cited

U.S. PATENT DOCUMENTS

| | | | |
|---|---|---|---|
| 2,610,137 | 9/1952 | Williamson et al. | 156/579 |
| 2,928,216 | 3/1960 | Orsini | 53/512 |
| 3,322,603 | 5/1967 | Grasso | 156/579 |
| 3,867,226 | 2/1975 | Guido et al. | 156/579 |
| 4,860,523 | 8/1989 | Tetishi et al. | 53/512 |
| 4,928,829 | 5/1990 | Di Bernardo | 53/512 |
| 5,215,445 | 6/1993 | Chen | 53/512 |

FOREIGN PATENT DOCUMENTS

| | | | |
|---|---|---|---|
| 0046592 | 3/1982 | European Pat. Off. | 53/512 |
| 53-23785 | 3/1978 | Japan | 53/512 |

Primary Examiner—Michele K. Yoder
Attorney, Agent, or Firm—John Forrest; Jacob Shuster

[57] ABSTRACT

An axially elongated tube is slideably and pivotally supported within a tubular housing from which the tube extends rearwardly for connection to a source of vacuum. The vacuum is selectively applied through the tube from a flattened forward end thereof to a workpiece after the tube is slideably displaced rearwardly from a retracted to an extended position within the housing. A hand grip on the housing enables it to be manually held in operative relation to the workpiece. A support assembly pivotally mounted on the housing adjustably positions a heating jaw electrically connected by a switch on the housing to a power supply for performance of heat sealing operations on the workpiece.

12 Claims, 4 Drawing Sheets 5,667,627

HAND HELD VACUUM HEAT SEALER APPARATUS

BACKGROUND OF THE INVENTION

The present invention relates to heat sealer devices through which vacuum heat sealing operations are performed on workpieces in a manner generally well known in the art.

Heat sealing operations have heretofore been performed by relatively large stationary apparatus fixedly mounted on marine vessels, such as Navy ships, for sealing plastic waste in odor barrier bags. Such apparatus is particularly designed for operation at a workstation having a power supply and a source of vacuum associated therewith. Hand held heat sealers of various sizes and types generally known in the art, were found to be unsuitable for the foregoing vacuum heat sealing operations at stationary workstations.

It is therefore an important object of the present invention to provide a portable, hand-held type of apparatus capable of being used to satisfactorily perform vacuum heat sealing operations at workstations where space is at a premium.

SUMMARY OF THE INVENTION

In accordance with the present invention, a tubular housing that is portable because of size and weight has a hand grip attached thereto so that it may be manually held within a limited workstation space in operative relation to an electrical power supply and a source of vacuum. A heat sealing jaw is mounted on the tubular housing by a pivotal support assembly for adjustable positioning thereof in front of the forward end of the tubular housing from which a flattened end portion of an inner nozzle tube projects for insertion into a workpiece on which heat sealing operations are to be performed. Electrical wiring from the heat sealing jaw under control of a switch mounted on the tubular housing, extends through protective housing sections of the pivotal support assembly to the electrical power supply. Also, the inner nozzle tube is supported within the tubular housing by a bearing assembly for limited pivotal displacement of its flattened end portion relative to the heat sealing jaw. During the supply of electrical energy from the power supply to the heat sealing jaw, the inner tube is in a retracted position within the tubular housing. The bearing assembly accommodates slideable displacement of the inner tube to an extended position projecting from the rear end of the tubular housing toward the source of vacuum, so as to selectively apply the vacuum to the workpiece at the flattened forward end of the inner tube.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 1 is a top plan view of a vacuum heat sealer apparatus constructed in accordance with one embodiment of the invention;

FIGS. 2A and 2B form an enlarged side section view of the apparatus taken substantially through a plane indicated by section line 2—2 in FIG. 1;

Figure 2A:
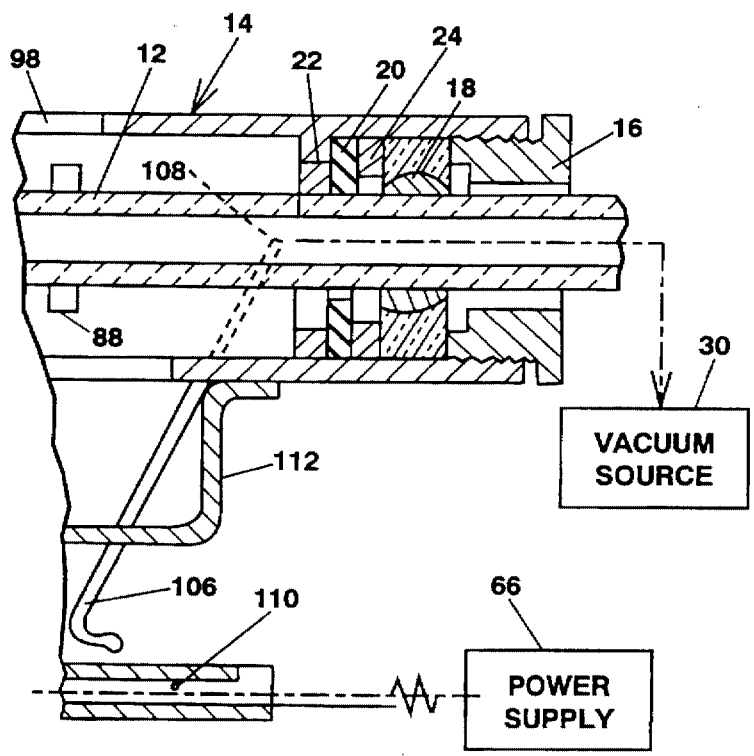
Figure 2B:
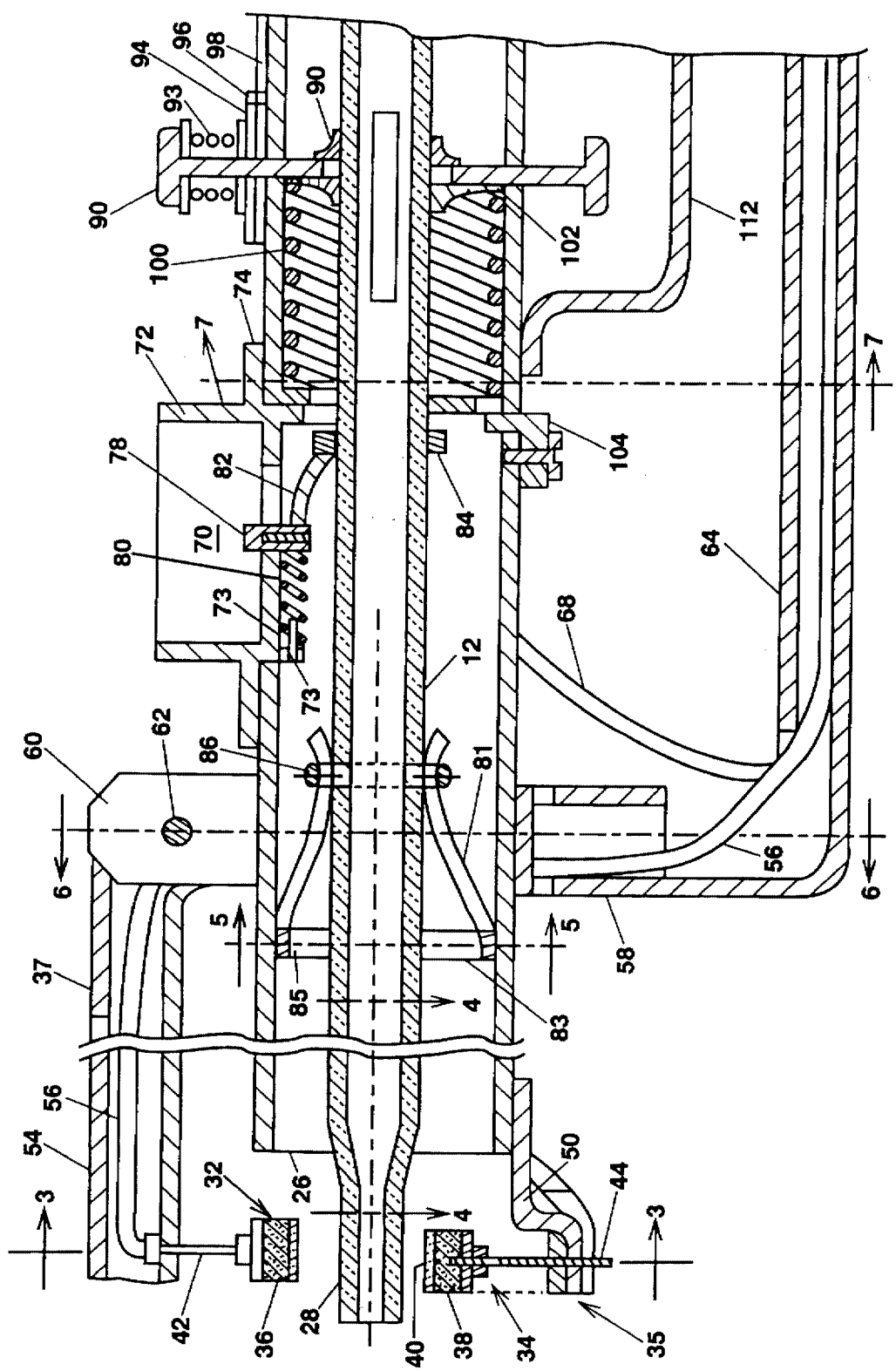
Figure 5:
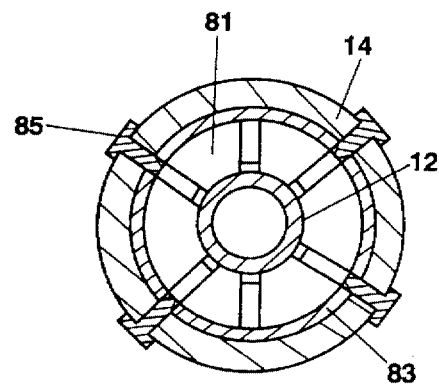
Figure 6:
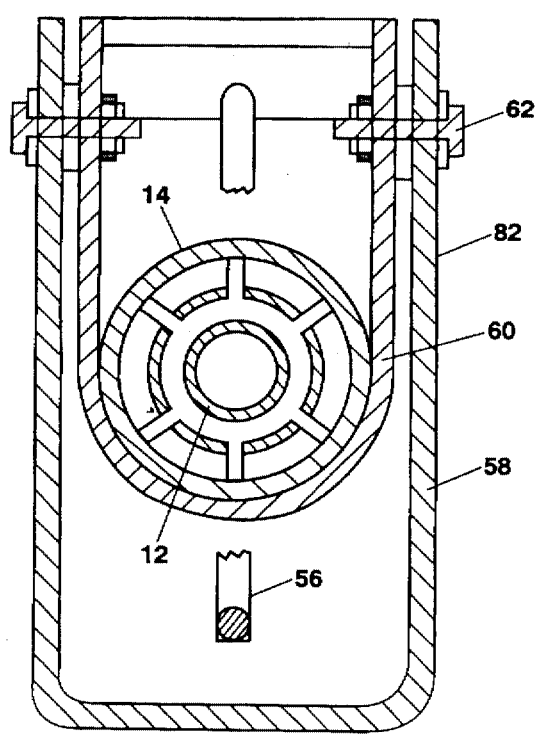
Figure 7:
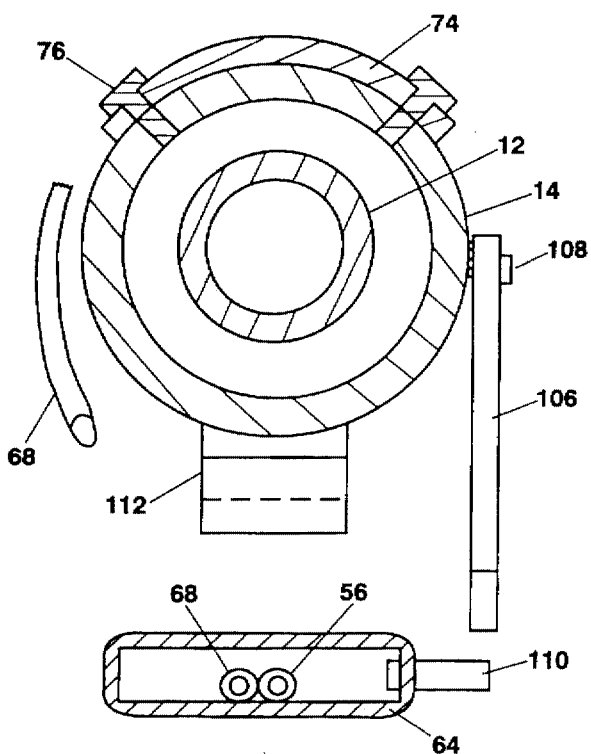
Figure 8:
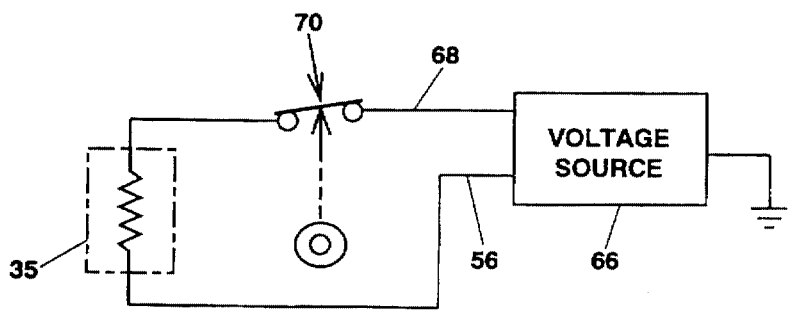

FIGS. 5, 6 and 7 are transverse section views taken substantially through planes indicated by section lines 5—5, 6—6 and 7—7 in FIG. 2B; and FIG. 8 is a simplified electrical circuit diagram illustrating the electrical relationship between certain components of the apparatus depicted in FIGS. 2A and 2B.

DETAILED DESCRIPTION OF PREFERRED EMBODIMENT

Figure 1:
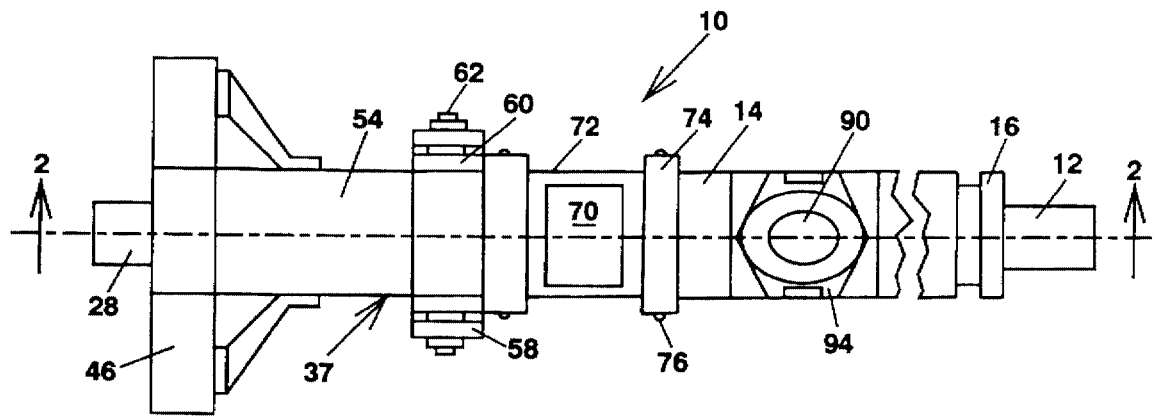

Referring now to the drawing in detail, FIG. 1 illustrates a hand-held heat sealer apparatus 10, constructed in accordance with one embodiment of the invention. The apparatus 10 includes an inner vacuum nozzle tube 12 projecting from opposite axial ends of an outer tubular housing 14 of such size and weight as to render the apparatus portable. As shown in FIG. 2A, a spherical bearing 18 is mounted within the tubular housing 14 adjacent to one of its axial ends having a plug 16 from which the inner tube 12 projects. The bearing 18 is located axially between the plug 16 and an internal housing projection 22 from which it is spaced by a spacer 24 and a washer 20 to pivotally and slideably support the tube 12 during its axial displacement within the tubular housing 14, limited by abutment of a stop ring 88 on the tube 12 with washer 20. The inner tube 12 also has a flattened tip portion 28 projecting from the forward end 26 of the housing 14 as shown in FIG. 2B, while the rear end of tube 12 projects from the plug 16 to a vacuum source 30 as diagrammed in FIG. 2A.

Figure 3:
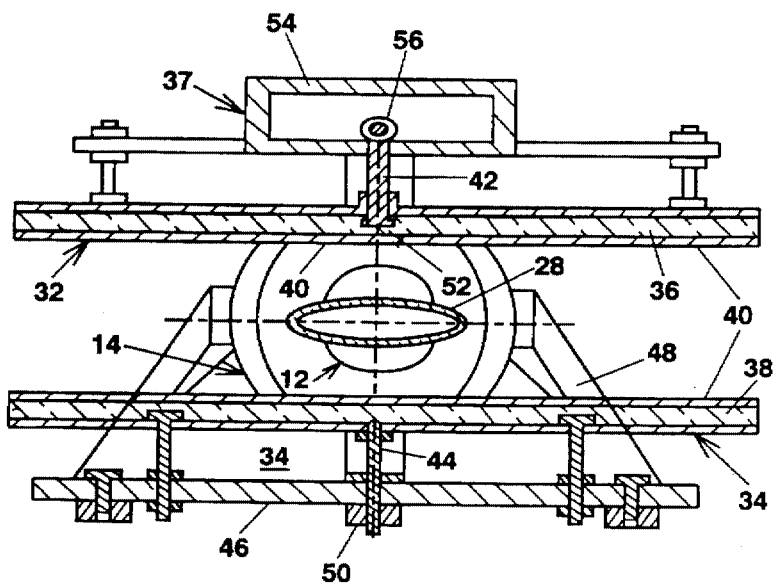
FIG. 3 is a transverse section view taken substantially through a plane indicated by section line 3—3 in FIG. 2B, illustrating the heat sealing jaw assembly associated with the apparatus.
Figure 4:
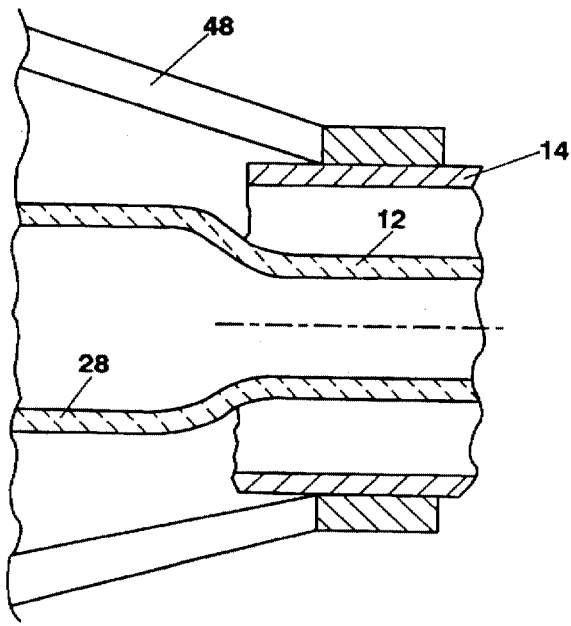
FIG. 4 is a partial section view taken substantially through a plane indicated by section line 4—4 in FIG. 2B.

The flattened tip end portion 28 at the forward end of inner nozzle tube 12 is pivotally displaceable within a heat sealing jaw assembly formed between a pair of jaws 32 and 34 having foam pads 36 and 38 covered by polymeric liners 40, as shown in FIGS. 2B and 3. Threaded support rods 42 and 44 respectively position the pads 36 and 38 in adjustably spaced relation to the axis of tubular housing 14 for jaw engagement by the flattened end portion 28 of the inner tube 12. The support rod 44 is anchored to a laterally extending bar 46 fixedly mounted on the tubular housing 14 by a pair of angular support arms 48 and an intermediate support element 50 to fixedly mount jaw 34. The support rod 42 carrying the foam pad 36 of jaw 32, has a metallic heating strip 52 embedded within the pad as more clearly seen in FIG. 3, and extends into the forward end of a housing section 54 of a support assembly 37 as more clearly seen in FIG. 2B. An electric cable 56 connected to the ends of the heating strip 52, extends in radially spaced relation to the tubular housing 14 on one side thereof through the housing section 54 from which an intermediate housing section 58 extends transversely thereof. As shown in FIGS. 2B and 6, a hinge support 60 embracing the tubular housing 14 pivotally mounts the support assembly 37 thereon by means of a pair of pivot bolts 62 at the intersection between the housing sections 54 and 58. The cable 56 connected to the jaw 32 extends from the housing sections 54 and 58 into a cross-sectionally smaller housing section 64 of the support assembly 37 as shown in FIG. 2B. Within housing section 64, cable 56, extends rearwardly in radially spaced relation to the tubular housing 14 on one side thereof opposite housing section 54. Protective enclosing support for cable 56 is thereby provided as it extends rearwardly to power supply 66 as diagrammed in FIG. 2A. Also protectively enclosed within housing section 64 is another cable 68 extending from a commercially available type of mini-switch assembly 70 mounted on the tubular housing 14. Thus, electrical wiring within the cables 56 and 68 are connected to the power supply 66 for heat sealing operation of the jaw assembly 35 under control of the switch assembly 70 as electrically diagrammed in FIG. 8.

With continued reference to FIG. 2B, the switch assembly 70 is retained within a switch housing 72 inserted into a rectangular opening formed in the tubular housing 14. The switch housing 72 is secured to the tubular housing 14 by means of arcuate supports 74 and fasteners 76 as shown in FIG. 7. A switch actuator 78 projects from the switch assembly 70 into the tubular housing 14 as shown in FIG. 2B, and is biased to its closed ON position by a spring 80. However, the switch actuator 78 is maintained in its opened OFF position as shown, by a leaf spring 82 extending therefrom into engagement with a switch control ring 84 fixed to the inner tube 12. Accordingly, the switch assembly 70 is turned on in response to axial displacement of the inner tube 12 from its power-off position. The switch actuator 78 is yieldably held in its OFF position by spring 80 anchored at one axial end to the switch housing 72 by fasteners 73. Leaf springs 81 are held in frictional contact with the inner tube 12 by a circular spring 86 as shown in FIG. 2B, and are held assembled by a ring 83 anchored to the tubular housing 14 by fasteners 85 as more clearly seen in FIG. 5, in order to yieldably hold tube 12 in its power-off position.

The inner tube 12 is axially displaceable within housing 14 from a retracted position for connection to the vacuum source 30 upon reaching an extended position established by the stop ring 88 fixed to tube 12 as aforementioned. In the extended position shown in FIG. 2A, the tube 12 is connected to the vacuum source and is releasably held in such position by stop bolts 90, as shown in FIG. 2B, under the bias of a spring 93. The stop bolts extend through guide slots in the tubular housing 14 and are threadedly received in a formation 92 fixed to the inner tube 12. One of the stop bolts 90 extends through a washer 94 seated in the tubular housing 14. A guide pin 96 extends from washer 94 through one of the guide slots 98 formed in the tubular housing 14 to accommodate axial displacement of tube 12 with the stop bolts 90 under the bias of spring 100. The spring 100 is fitted within the tubular housing 14 over the inner tube 12 between annular washer 102 abutting the bolts 90 and an L-shaped portion 104 of the switch housing 72 fixed to the tubular housing 14. Accordingly, when the stop bolt 90 under the bias of spring 93 is retracted and held withdrawn from the formation 92 on the inner tube 12 by spring 93, the bolts 90 are displaced by spring 100 through the guide slots in the tubular housing 14 out of alignment with formation 92 to free the inner tube 12 for slideable displacement to its extended position for connection to the vacuum source 30, by a hose for example.

The support assembly 37 as hereinbefore described, is pivotally displaceable about the aligned axes of the pivot bolts 62 to displace jaw 32 toward the flattened portion 28 of the inner tube to a heat sealing position. The support assembly 37 may be latched in such heat sealing position by a hook element 106 pivotally mounted on the tubular housing 14 by a pivot bolt 108 for engagement with a pin 110 projecting laterally from the housing section 64 of the support assembly 37 as shown in FIGS. 2 and 7. A manual grip handle 112 is fixed to the tubular housing 14 between the latch bolt 108 and the switch assembly 70, in spaced relation to the housing section 64.

The apparatus 10 as hereinbefore described may be used as a sealer with the inner tube 12 in its retracted position within the tubular housing 14 disconnected from the vacuum source 30. Heat sealing of a workpiece without use of vacuum may then be performed by insertion of the workpiece between the jaws 32 and 34 and pivotal displacement of jaw 32 carried by the support assembly 37 to a desired position, followed by the application of heating current from a suitably sized power supply 66 as diagrammed in FIG. 8 in accordance with procedures well known in the art. Use of the apparatus 10 for vacuum heat sealing purposes, on the other hand, involves extension of the inner tube 12 from housing 14 for connection to vacuum source 30. The jaw 32 is then positioned for heat sealing purposes by pivotal displacement of the handle assembly 37, which is maintained in such position by the latch 106, as shown in FIG. 2A, so as to free the operator's hands while the vacuum is initially applied through the inner tube to the workpiece. The inner tube 12 in then retracted into the housing 14 before electrical heat sealing energy from the power supply 66 is fed to the jaws to complete a vacuum heat sealing operation. Heat seal seams are thereby formed on a bag as the workpiece, for example. Such operations are performed by means of the apparatus 10 which is relatively small in size and portable so as to be hand held through grip handle 112 rather than bolted to some workstation.

Obviously, other modifications and variations of the present invention may be possible in light of the foregoing teachings. It is therefore to be understood that within the scope of the appended claims the invention may be practiced otherwise than as specifically described.

What is claim is:

1. In combination with a source of vacuum and an electrical power supply, apparatus including a switch and heating jaw means connected by wiring under control of the switch to the power supply for performance of heat sealing operations on a workpiece to which the vacuum from said source is applied; a portable housing; and means mounting the jaw means on the housing for adjustable positioning thereof, wherein the improvement comprises: an elongated tube within the housing through which the vacuum is applied to the workpiece; and means supporting the tube within the housing for slideable and pivotal displacement relative to the heating jaw means to effect said heat sealing operations while the portable housing is held in operative relation to the workpiece.

2. The improvement as defined in claim 1 including stop means on the tube for limiting said slideable displacement thereof between retracted and extended positions within the housing at which the switch is selectively closed and the vacuum is selectively applied, respectively.

3. The improvement as defined in claim 2 including means for yieldably holding the tube in said retracted and extended positions.

4. The improvement as defined in claim 3 wherein said support means includes a pair of wire enclosing sections extending longitudinally along the housing in spaced relation thereto on opposite sides thereof, an intermediate section extending traversely of the housing interconnecting said pair of wire enclosing sections and hinge means mounted on the housing within the intermediate section of the support means for pivotal mounting thereof on the housing.

5. The improvement as defined in claim 4 including latch means pivotally mounted on the housing and engageable with the support means for releasably holding the jaw means in a predetermined adjusted position relative to the housing.

6. The improvement as defined in claim 1 wherein said means mounting the jaw means includes a pair of wire enclosing sections extending longitudinally along the housing in spaced relation thereto on opposite sides thereof, an intermediate section extending traversely of the housing interconnecting said pair of wire enclosing sections and hinge means mounted on the housing within the intermediate section of the support means for pivotal mounting thereof on the housing.

7. The improvement as defined in claim 1 including latch means pivotally mounted on the housing and engageable with the support means for releasably holding the jaw means in a predetermined adjusted position relative to the housing.

8. In combination with a source of vacuum and an electrical power supply, apparatus including heating jaw means connected by wiring to the power supply for performance of heat sealing operations on a workpiece to which the vacuum from said source is selectively applied; a portable housing; and support means pivotally mounting the jaw means on the housing for adjustable positioning thereof, wherein the improvement comprises; an elongated tube within the housing through which the vacuum is applied to the workpiece; and bearing means supporting the tube within the housing for slideable displacement relative to the source of vacuum and pivotal displacement relative to the heating jaw means.

9. The improvement as defined in claim 8 wherein said support means includes a pair of wire enclosing sections extending longitudinally along the housing in spaced relation thereto on opposite sides thereof, an intermediate section extending traversely of the housing interconnecting said pair of wire enclosing sections and hinge means mounted on the housing within the intermediate section of the support means for pivotal mounting thereof on the housing.

10. The improvement as defined in claim 8 including latch means pivotally mounted on the housing and engageable with the support means for releasably holding the jaw means in a predetermined adjusted position relative to the tube.

11. The improvement as defined in claim 8 wherein said elongated tube has a flattened end portion from which the vacuum is applied to the workpiece.

12. Apparatus for heat sealing a workpiece, comprising; an elongated nozzle tube having a flattened end portion; a pair of heating jaws; a housing on which said heating jaws are adjustably mounted; bearing means supporting the nozzle tube for slidable displacement within the housing between retracted and extended positions in which the jaws are electrically heated and the nozzle tube is connected to a vacuum source, respectively; and means for pivotally displacing the flattened end portion of the nozzle tube in the retracted position thereof between the heating jaws while disconnected from said vacuum source.

* * * * *